(No Model.) 2 Sheets—Sheet 1.

G. A. HOLT, Dec'd.
M. A. Holt, Administratrix.
ELECTRICAL INDICATING APPARATUS.

No. 418,871. Patented Jan. 7, 1890.

(No Model.) 2 Sheets—Sheet 2.

G. A. HOLT, Dec'd.
M. A. HOLT, Administratrix.
ELECTRICAL INDICATING APPARATUS.

No. 418,871. Patented Jan. 7, 1890.

Witnesses,
Geo. H. Strong

Inventor,
George A. Holt
By Dewey & Co.
attys

United States Patent Office.

GEORGE A. HOLT, OF OAKLAND, CALIFORNIA; MARY E. HOLT ADMINISTRATRIX OF SAID GEORGE A. HOLT, DECEASED.

ELECTRICAL INDICATING APPARATUS.

SPECIFICATION forming part of Letters Patent No. 418,871, dated January 7, 1890.

Application filed April 15, 1889. Serial No. 307,322. (No model.)

*To all whom it may concern:*

Be it known that I, GEORGE A. HOLT, of the city of Oakland, county of Alameda, State of California, have invented an Improvement in Electrical Indicating Apparatus; and I hereby declare the following to be a full, clear, and exact description of the same.

My invention relates to the class of electrical indicators.

The object of my invention is to provide for the electrical transmission of the readings or record of one indicator located in a given position to one or more indicators located or distributed at convenient points, whereby the condition of the first-named indicator may be readily seen without examining it directly.

My invention consists in the novel circuit maker and breaker in connection with the indicator whose readings are to be transmitted, the novel mechanism of the indicator to which the readings are transmitted, an electric circuit, and details of construction, all of which I shall hereinafter fully describe by reference to the accompanying drawings, in which—

Figure 1:
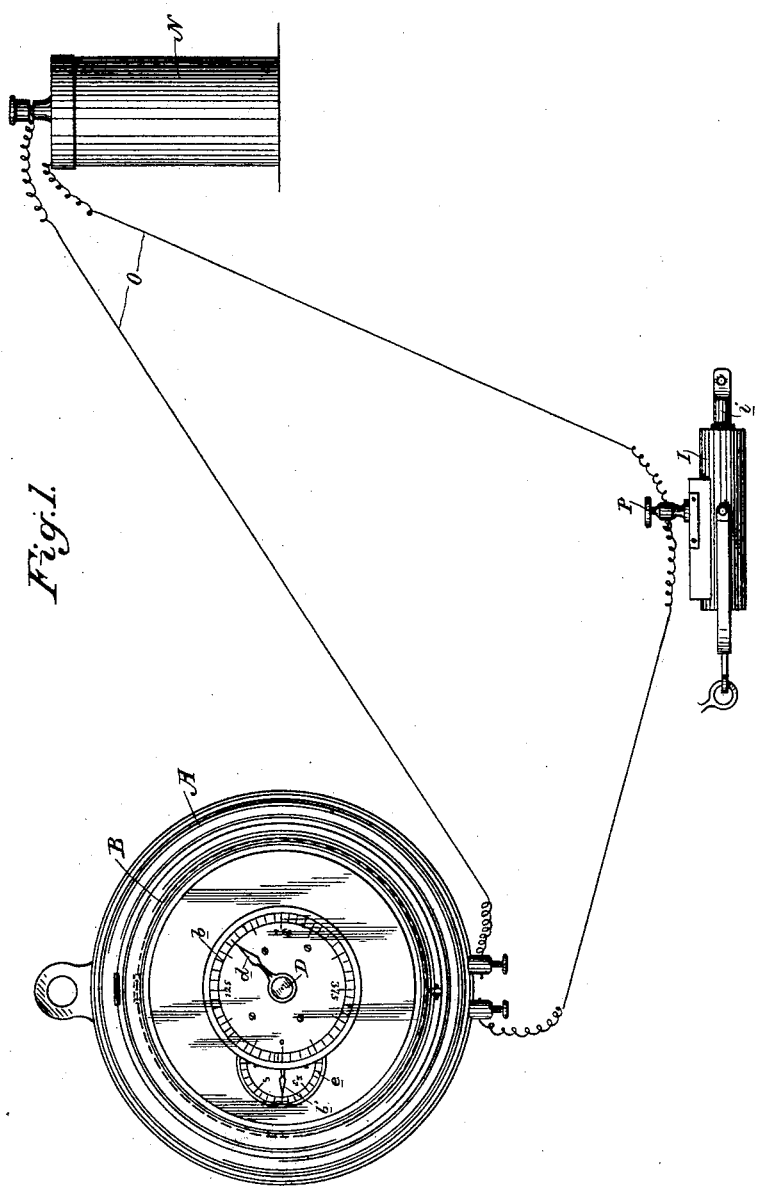
Figure 2:
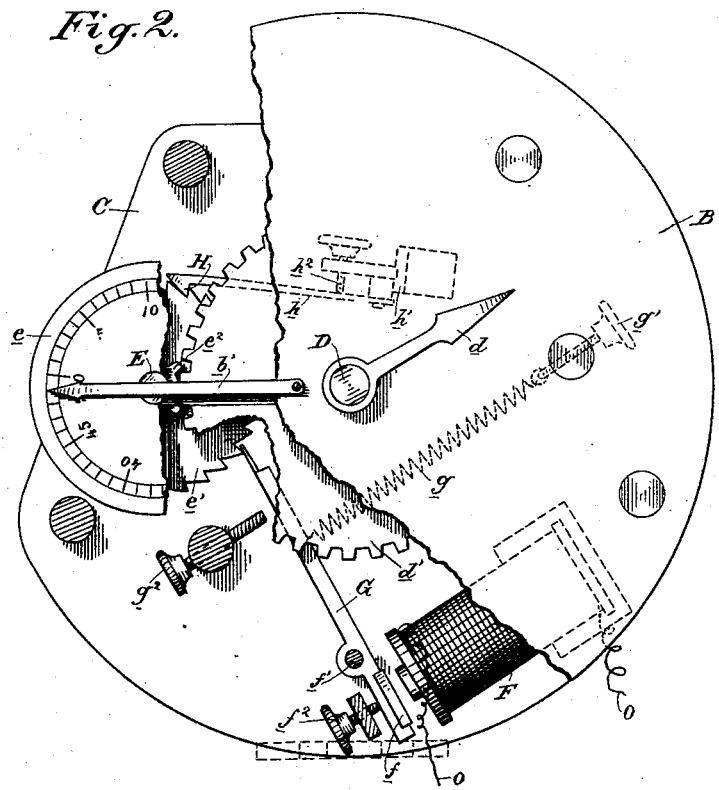
Figure 3:
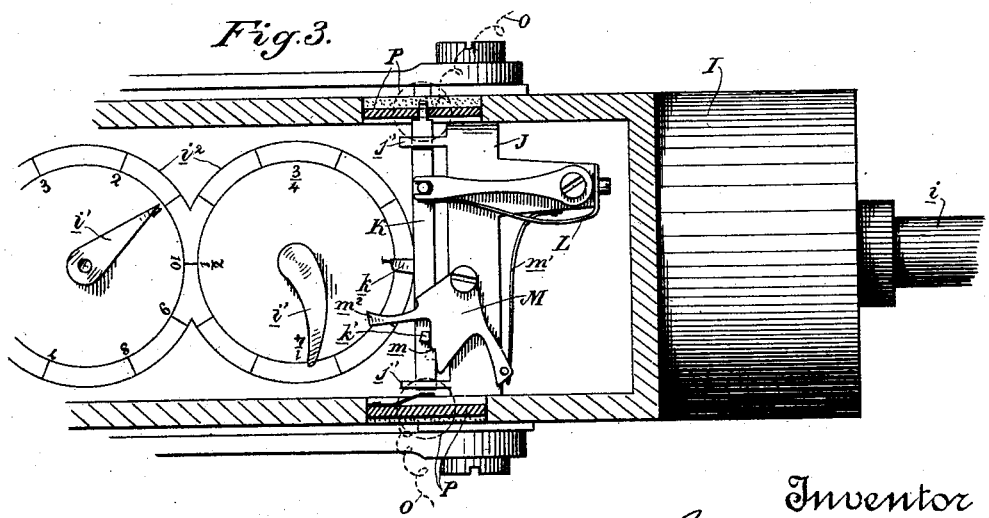

Figure 1 is a general plan of the connection of the several parts of my apparatus. Fig. 2 is a plan of the indicator to which the readings are transmitted. Fig. 3 is a plan of the circuit maker and breaker connected with the indicator whose readings are to be transmitted.

As before stated, the object of my invention is to transmit the readings or record of any kind of indicator which is located in a given position.

In order to fully understand my invention, I have deemed it sufficient to illustrate and describe it in connection with the indicator of a ship's log, which may represent any kind of an indicator.

I shall first describe the indicator to which the readings of the given indicator are to be transmitted. A is the case of the indicator, said case having a hinged front cap provided with glass, whereby the dials may be seen. Hinged to the case is a dial-carrying plate B, to the under side of which is attached the frame-work C of the indicating mechanism. D is the main shaft of this mechanism, the upper end of which carries a pointer or hand $d$, which is adapted to travel over the face of the dial $b$, which is secured to the dial-carrying plate B. E is a second shaft, the upper end of which carries a revolving dial-plate $e$, which travels under a fixed pointer or hand $b'$, secured to the plate B. The frame-work C has mounted upon it an electro-magnet F, of which $f$ is the armature. This armature is mounted pivotally upon a shaft $f'$ and carries the actuating-pawl G, said pawl being controlled by a spring $g$, which is adjusted by a set-screw $g'$, while a set-screw $g^2$ limits the movement of the pawl. The spring $g$ returns the pawl to place and keeps the armature away from the magnet, the removal of said armature from the magnet being limited and adjusted by a set-screw $f^2$. Upon the second shaft E is mounted a ratchet-wheel $e'$, with one side of which the actuating-pawl G engages. A retaining-pawl H engages the other side of the ratchet-wheel, said pawl being mounted on the end of a spring-arm $h$, which is supported by a bracket $h'$, and the tension of the said spring-arm is regulated by the set-screw $h^2$ bearing against it. On the top of the shaft E is a pinion $e^2$, which meshes with a large gear $d'$ on the main shaft D. It will now be seen that when the electro-magnet is energized so as to attract its armature, the actuating-pawl G, engaging the ratchet-wheel, turns said wheel, and the wheel is held in proper position to prevent overthrow by means of the retaining-pawl H. This movement of the ratchet-wheel is transmitted through the shaft E primarily to the dial-plate $e$ on its top, so that each revolution of the shaft E is indicated by the fixed pointer $b'$ and the revolving-dial. The movement is further transmitted through the pinion $e^2$ and the gear $d'$ to the main shaft D, which operates the hand or pointer $d$ above, so that the multiples of the revolutions of the shaft E are indicated on the main dial.

I represents the indicator of a ship's log, the details of the construction of which need not be specifically described, as they form no part of my invention, which can be readily understood without such explanations. It is sufficient to say that a propeller is attached by a cord or line to the end of the shaft $i$, whereby this shaft is revolved, and its revolutions are transmitted to the pointers or fingers $i'$, which move around the several dials $i^2$ of the log-indicator. One of these fingers $i'$ is the one which, upon a complete revolution, indicates a mile, and in connection with this moving finger, which may stand for the moving finger of any indicator, I will describe the circuit maker and breaker. Within the frame of the log-indicator is mounted horizontally a fixed bracket J, having guide-sockets $j'$. In these guide-sockets is mounted a sliding bolt K, which is adapted to move back and forth longitudinally. The bolt is held over to one side by means of a spring L, and is moved to the other side by means of a small lug $k$, projecting from its side, and with which the finger $i$ of the log-indicator is adapted to come in contact just when it indicates a complete revolution or at any other portion of its revolution which may be desired. In order to hold the bolt temporarily over to the side to which it is forced by the engagement of the finger, I have pivoted to the bracket a catch M, which is provided with a notch $m$, said notch engaging a small lug $k'$ on the sliding bolt K. The catch is held to position by a spring $m'$, and it has also a projecting arm $m^2$, with which the rotating finger $i'$ is adapted to come in contact after it has disengaged itself from the lug $k$ of the bolt K and proceeded a little farther on its revolution.

The operation of this device is as follows: When the rotating finger $i'$ comes in contact with the lug $k$ on the side of the sliding bolt K, it moves said bolt longitudinally until its other lug $k'$ engages the notch $m$ of the catch M, so that the bolt is held over to the side to which it is forced. This position is maintained by the bolt until the rotating finger $i'$ comes in contact with the arm $m^2$ of the catch M, and, pressing against it, throws its notch $m$ away from the lug $k'$, thus freeing the sliding bolt, which, under the influence of the spring L, immediately returns to the former position, and when the finger $i'$ passes from contact with the arm $m^2$ the spring $m'$ throws the catch to position again, ready for the next engagement.

N is an electric battery of any suitable description, and O are the circuit-wires from said battery. These wires extend to contact-posts P upon the frame of the log-indicator I. With the lower end of one of these posts the sliding bolt K is always in contact; but it is not in contact with the other post until it is thrown over to one side, as heretofore described, thus closing the circuit; and when the sliding bolt is thrown back the circuit is opened again. The circuit includes the electro-magnet F of the indicator A. It is the intention to place the indicator A at any suitable point where it can be conveniently inspected, and, when necessary or if desirable, several indicators of similar character may be included in the same circuit, and may be located in different positions where it is most convenient to see them.

The general operation of the apparatus is as follows: As the finger $i'$ of the log or other indicator comes around to a given position it throws the sliding bolt K, as heretofore described, and closes the circuit, so that the indicator A is operated and shows the readings or record of the log-indicator. The circuit is opened again by the retraction of bolt K by its spring. It is desirable, for the sake of accuracy, that the circuit shall be closed an appreciable length of time, so that no mistake can be made. This is the object of holding the sliding bolt K over to its contact for a short time before releasing it and allowing it to open the circuit again.

Having thus described my invention, what I claim as new, and desire to secure by Letters Patent, is—

1. In electrical indicating apparatus, the combination of separate indicators, an electric circuit including them, and the means by which said circuit is closed and opened, whereby the movement of one indicator is transmitted to another, consisting of a sliding contact-bolt adapted to make and break the circuit, a moving finger of the first-named indicator for operating said bolt, and a spring-controlled catch for holding the bolt in position to close the circuit, substantially as described.

2. In electrical indicating apparatus, the combination of separate indicators, an electric circuit including them, and the means by which said circuit is closed and opened, whereby the movement of one indicator is transmitted to another, consisting of a sliding contact-bolt adapted to make and break the circuit, a moving finger of the first-named indicator for throwing the bolt to contact to close the circuit, a catch for holding the bolt in position, and a spring for retracting said bolt to open the circuit, substantially as described.

3. In electrical indicating apparatus, the combination of separate indicators, an electric circuit including them, the sliding contact-bolt for closing and opening the circuit, the moving finger of one of the indicators, and the spring for operating the bolt, an automatic catch engaging the bolt for holding it in position to close the circuit, and a trip for said catch to cause it to release the bolt to open the circuit, substantially as described.

4. In electrical indicating apparatus, the combination of separate indicators, an electric circuit including them, the sliding contact-bolt for closing and opening the circuit, the moving finger of one of the indicators, and the spring for operating the bolt, the pivoted spring-controlled catch for engaging the bolt to hold it in position to close the circuit, and the arm of the catch with which the moving finger of the indicator comes in contact, whereby said catch is tripped to release the bolt to open the circuit, substantially as described.

5. The circuit maker and breaker of an electrical indicating apparatus, consisting of the sliding contact-bolt adapted by its movement to close and open the circuit, and having a lug upon its side with which the rotating finger of the indicator is adapted to come in contact, whereby said bolt is moved to one side, a catch for holding the bolt in position to close the circuit, and the spring for returning it again, substantially as described.

6. In electrical indicating apparatus, the circuit maker and breaker consisting of the sliding contact-bolt having a lug upon its side with which a moving finger of the indicator comes in contact, whereby said bolt is moved into electrical contact to close the circuit, and the spring to return said bolt to open the circuit, in combination with the means for holding said bolt in contact temporarily and relieving it, consisting of the spring-controlled pivoted catch, the lug on the sliding bolt engaging the said catch, and the arm of the catch engaging the moving finger of the indicator, whereby it is tripped, substantially as described.

7. In electrical indicating apparatus, the indicator consisting of the combination of the electro-magnet, the pivoted armature and set-screw for regulating it, the actuating-pawl carried by the armature, the adjustable spring for controlling it and the set-screw for limiting it, the ratchet operated by the actuating-pawl and geared shafts of the markers operated by the ratchet, retaining-pawl controlling the ratchet and provided with a spring-arm, and the set-screw bearing against said arm for regulating said pawl, all arranged and adapted to operate substantially as described.

In witness whereof I have hereunto set my hand.

GEORGE A. HOLT.

Witnesses:
S. H. NOURSE,
H. C. LEE.